United States Patent [19]
Park et al.

[11] Patent Number: 5,719,093
[45] Date of Patent: Feb. 17, 1998

[54] METHOD AND APPARATUS FOR DESORBING TEDA AND METHYL IODINE FROM USED TEDA-IMPREGNATED ACTIVE CARBON BY UTILIZING FLUIDIZED BED

[75] Inventors: Geun-Il Park; Myeong-Soo Jeong; Bum-Hoe Kim; Hoo-Kun Lee, all of Daejeon-Si, Rep. of Korea

[73] Assignee: Korea Atomic Energy Research, Daejeon-si, Rep. of Korea

[21] Appl. No.: 572,710

[22] Filed: Dec. 14, 1995

[30] Foreign Application Priority Data

Jun. 2, 1995 [KR] Rep. of Korea ............ 95-14641

[51] Int. Cl.⁶ .................. B01J 20/34; B01J 38/12; B01J 38/32
[52] U.S. Cl. .................. 502/44; 502/38; 502/41
[58] Field of Search .................. 502/38, 41, 44

[56] References Cited

U.S. PATENT DOCUMENTS 5,124,292  6/1992  Larsen et al. .................. 502/38

Primary Examiner—Glenn Caldarola
Assistant Examiner—Alexander G. Ghyka
Attorney, Agent, or Firm—Armstrong,Westerman, Hattori,McLeland & Naughton

[57] ABSTRACT

A method and an apparatus are disclosed for desorbing TEDA by utilizing a fluidized bed so as to reuse a used impregnated active carbon for the purpose of removing toxic materials from a fluid. The impregnated active carbon is injected into a fluidized bed at a high temperature to carry out a desorbing process, in such a manner that TEDA and $CH_3I$ are desorbed from the impregnated active carbon at a high temperature by utilizing the high volatility of TEDA and $CH_3I$. If a heated air is injected through an air inlet into the desorbing tower, the high temperature air and the used impregnated active carbon are met in a fluidized state, with the result that the active carbon with TEDA and $CH_3I$ desorbed is discharged.

1 Claim, 1 Drawing Sheet

METHOD AND APPARATUS FOR DESORBING TEDA AND METHYL IODINE FROM USED TEDA-IMPREGNATED ACTIVE CARBON BY UTILIZING FLUIDIZED BED

FIELD OF THE INVENTION

The present invention relates to a method and an apparatus for desorbing TEDA by utilizing a fluidized bed so as to reuse a used impregnated active carbon for the purpose of removing toxic materials from a fluid.

BACKGROUND OF THE INVENTION

A TEDA-impregnated active carbon is used in military gas mask for removing toxic gases, and is used in a nuclear reactor facility for adsorbing an organic radioactive iodine. The organic radioactive iodine exists in the form of methyl iodide ($CH_3I$) which is highly volatile, and therefore, the organic radioactive iodine can be hardly removed through a physical adsorption by the general active carbon. Therefore, an active carbon in which TEDA (tri-ethylene diamine) is impregnated is utilized in removing the radioactive iodine.

The active carbon in which chemicals such as TEDA are impregnated is capable of adsorbing and removing the organic iodide through chemical reactions.

The impregnated active carbon which is used in the off-gas treatment system of a nuclear power plant for removing the organic radioactive iodine is subjected to a adsorption efficiency test. If that test has been failed, it is replaced with a new impregnated active carbon. The used impregnated active carbon is classified into a radioactive solid waste, and is currently stored in a temporary waste storage.

Further, in accordance with the extension of the operating time of the nuclear power plants, the amount of the used impregnated active carbon is being gradually increased. Therefore, if the used TEDA-impregnated active carbon is reused, there can be obtained various advantages such as the reuse of resources, the decrease of solid waste, and the improvement of the operating economy. Therefore, a method for desorbing the impregnated materials from the active carbon is urgently needed.

Thus the amount of the used impregnated active carbon, which has been used in the gaseous waste treating system of nuclear power plants, and which is discharged in the form of a radioactive waste, is gradually increased in accordance with the extension in the operating time of nuclear power plants as described above. Considering this fact, it is desirable to reuse the used active carbon rather than to incinerate it or to solidify it.

If the used active carbon to be reused meets the requirement of the ANSI N 509 and N 510 with the ASTM test methods, there will be no problem in using the used active carbon in the off-gas treatment system.

Generally, in desorbing the materials adsorbed into the active carbon, the temperature and pressure are used. However, in desorbing the TEDA and the organic radioactive iodine from the TEDA active carbon, it is desirable to vary only the temperature.

SUMMARY OF THE INVENTION

Therefore it is the object of the present invention to provide a method and an apparatus for desorbing TEDA by utilizing a fluidized bed so as to reuse a used impregnated active carbon, in which the impregnated active carbon is injected into a fluidized bed at a high temperature to carry out a desorbing process, in such a manner that TEDA and $CH_3I$ are desorbed from the impregnated active carbon at a high temperature by utilizing the high volatility of TEDA and $CH_3I$.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
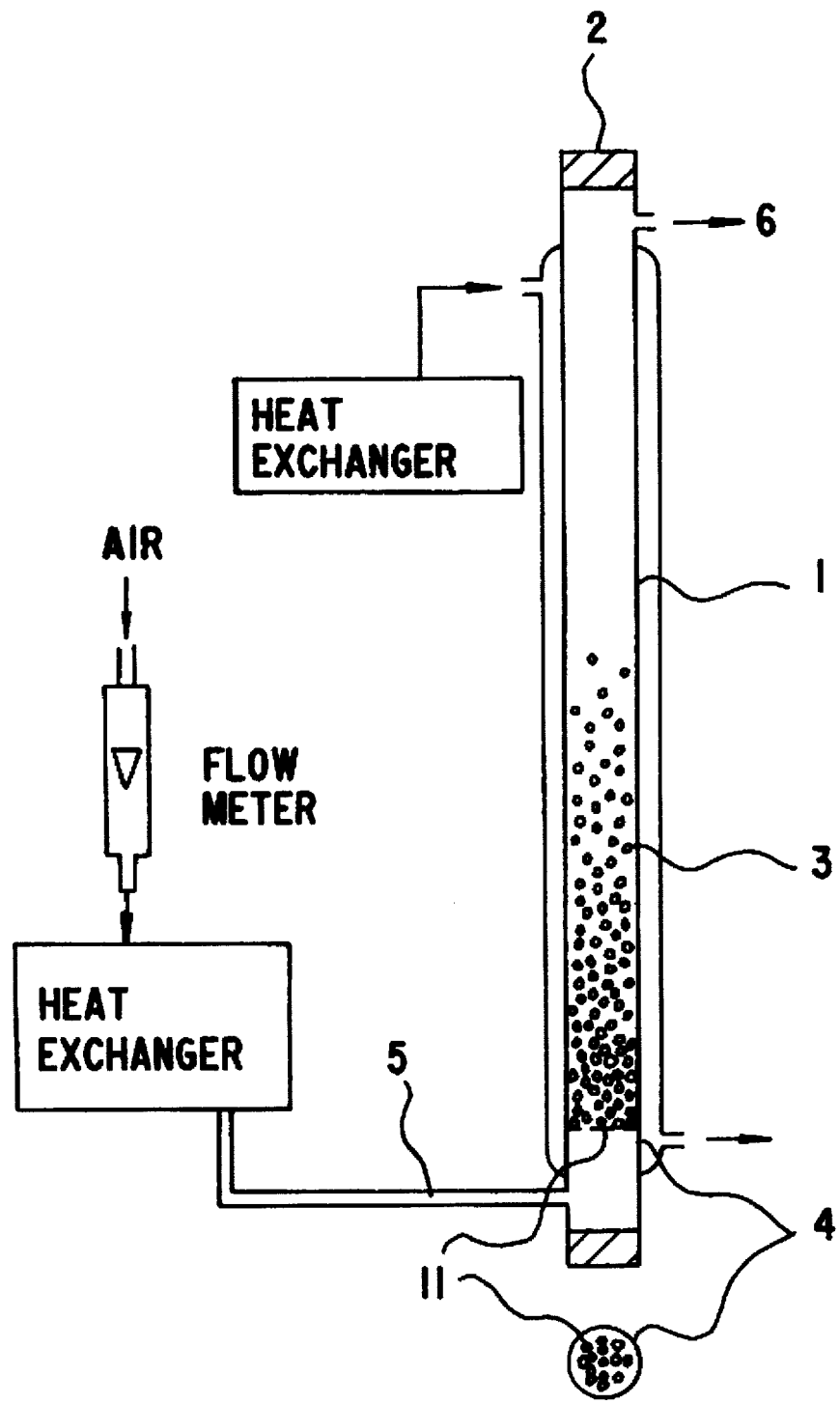
FIG. 1 is a sectional view of the preferred embodiment of the fluidized bed type desorbing apparatus.

A fluidized bed type desorbing tower 1 which is a main body of the desorbing apparatus is provided with an active carbon injecting inlet 2. A used impregnated active carbon 3 is injected through the inlet 2, and is maintained at a certain height above a sieve plate 4 of the fluidized bed type desorbing tower 1. The fluidized bed type desorbing tower 1 consists of a dual tube, and supplies steam so as to maintain a high temperature.

If a heated air is injected through an air inlet 5 into the fluidized bed type desorbing tower 1, the high temperature air and the used impregnated active carbon are met in a fluidized state, with the result that the active carbon with TEDA and $CH_3I$ desorbed is discharged. That is, at the high temperature, a fluidizing process is carried out, with the result that the active carbon with TEDA and $CH_3I$ desorbed is discharged.

The flow rate of the high temperature air which is injected into the lower portion of the fluidized bed type desorbing tower 1 is maintained such that an optimum desorption should occur within the fluidized bed type desorbing tower.

In the above described desorbing method, a high temperature air is supplied into the lower portion of the fluidized bed type desorbing tower, so that the used active carbon and the high temperature air would contact together above the sieve plate, and that TEDA and $CH_3I$ would be desorbed within the fluidized bed type desorbing tower.

Thus an aqueous desorbing solution is not required, and a drying apparatus which is needed for drying the active carbon when using the aqueous solution is not required. Therefore, the operation becomes simple, and there are not needed an aqueous desorbing vessel, a transporting means for transporting the desorbed active carbon, and the drying apparatus. Further, the desorbing apparatus is simple, and the fine particles impregnated on the active carbon can be removed. Therefore, the apparatus of the present invention is suitable for readsorbing the reused active carbon subsequently.

EXAMPLE

An active carbon impregnated with TEDA of 8 to 16 meshes was dried at a temperature of 100° C. for 24 hours so as to remove the water content, and then, the dried active carbon was measured as to its initial weight. The TEDA-impregnated active carbon was injected into the fluidized bed type desorbing tower by 20–40 cm above the sieve plate. Then a heated air of 90°–100° C. was supplied into the lower portion of the fluidized bed type desorbing tower, so that the impregnated active carbon and the high temperature air would form a fluidized bed, and that a desorption would occur. The desorption was continued for about 60 minutes. After this operation, the active carbon was discharged through the lower portion of the fluidized bed type desorbing tower, and then, the weight of the discharged active carbon was measured. This measured weight was compared with the initial weight of the TEDA-impregnated active carbon, thereby deciding the amount of the desorption.

Further, an acetonitrile solution was added to the active carbon, and then, the mixture was subjected to an extracting process for 3 hours. Then the content of TEDA was analyzed, and the result showed that the initial content of TEDA in the TEDA-impregnated active carbon was 5%, and that the TEDA content after the fluidizing desorption process was about 0.5%. This corresponds to a desorption of over 90%. That is, about 90% of TEDA was evaporated from the used impregnated active carbon during the desorption process.

What is claimed is:

1. A method for desorbing TEDA and $CH_3I$ from a used TEDA-impregnated active carbon by utilizing a fluidized bed, comprising the steps of:

drying a TEDA-impregnated active carbon to remove water and to obtain a dried active carbon;

filling said dried active carbon to above a sieve plate of a fluidized bed type desorbing tower; and supplying a heated air of 90°–100° C. into a lower portion of said fluidized bed type desorbing tower, whereby said TEDA-impregnated active carbon and said high temperature air are made to form a fluidized bed, and a desorption occurs.

* * * * *